(12) United States Patent
Delaney et al.

(10) Patent No.: US 7,609,821 B2
(45) Date of Patent: Oct. 27, 2009

(54) MULTI-MODE MESSAGE ROUTING AND MANAGEMENT

(75) Inventors: Jeffrey Delaney, Hudson, NH (US);
William H. Kirtley, Boston, MA (US);
Robert Kuszewski, Arlington, MA (US); Robert Mathews, Somerville, MA (US); David Page, Manchester, MA (US); Martin Sarabura, Jerseyville (CA); Gregory Warden, Belmont, MA (US)

(73) Assignee: Varolii Corporation, Seattle, WA (US)

( * ) Notice: Subject to any disclaimer, the term of this patent is extended or adjusted under 35 U.S.C. 154(b) by 345 days.

(21) Appl. No.: 11/334,958

(22) Filed: Jan. 19, 2006

(65) Prior Publication Data

US 2006/0177021 A1 Aug. 10, 2006

Related U.S. Application Data

(63) Continuation of application No. 09/496,170, filed on Feb. 1, 2000, now Pat. No. 6,999,565.

(51) Int. Cl.
*H04M 11/00* (2006.01)

(52) U.S. Cl. ............... 379/88.13; 379/88.11; 379/88.17; 379/88.23

(58) Field of Classification Search .............. 379/88.18, 379/88.22, 88.25, 211.03, 88.13, 88.14, 88.23
See application file for complete search history.

(56) References Cited

U.S. PATENT DOCUMENTS 4,941,168 A 7/1990 Kelly, Jr.
4,972,461 A 11/1990 Brown et al.
5,179,660 A 1/1993 Devany et al.
5,287,498 A 2/1994 Perelman et al.
5,371,787 A 12/1994 Hamilton
5,479,411 A 12/1995 Klein
5,630,060 A * 5/1997 Tang et al. .................. 709/238

(Continued)

FOREIGN PATENT DOCUMENTS

WO WO98/58491 12/1998

(Continued)

OTHER PUBLICATIONS

Brunson, Gordon R., et al. Unified Messaging—A Value-Creating Engine for Next-Generation Network Services, Bell Labs Technical Journal, Apr.-Jun. 1999, 71-87, USA.

*Primary Examiner*—Simon Sing
(74) *Attorney, Agent, or Firm*—Miele Law Group PC (57) ABSTRACT

Transmission of messages composed on one or more input devices to a single or multiple recipients by means of one or plural communication modes is facilitated. Such communication modes may include conventional or wireless telephone, facsimile transmission, pager, e-mail, postal mail or courier. Thus, a message may be directed to a single recipient via multiple modes, such as e-mail and fax, in order to ensure the earliest possible receipt of the message; or may be directed to multiple recipients by a single mode or by different modes. In the case of multiple-mode delivery, "escalation" rules may specify conditions under which different delivery modes may be sequentially employed. Automatic follow-up to determine whether a message has been received, as well as automatic sender notification upon confirmation of receipt, may be employed. The system is capable of sending messages having embedded questions, and facilitating multi-question surveys.

10 Claims, 5 Drawing Sheets

U.S. PATENT DOCUMENTS

| | | | |
|---|---|---|---|
| 5,673,256 A | 9/1997 | Maine | |
| 5,706,334 A | 1/1998 | Balk et al. | |
| 5,740,231 A | 4/1998 | Cohn et al. | |
| 5,742,905 A | 4/1998 | Pepe et al. | |
| 5,758,088 A | 5/1998 | Bezaire et al. | |
| 5,794,039 A | 8/1998 | Guck | |
| 5,796,394 A | 8/1998 | Wicks et al. | |
| 5,818,447 A | 10/1998 | Wolf et al. | |
| 5,838,252 A | 11/1998 | Kikinis | |
| 5,841,966 A | 11/1998 | Irribarren | |
| 5,850,594 A | 12/1998 | Cannon et al. | |
| 5,870,454 A | 2/1999 | Dahlen | |
| 5,872,926 A | 2/1999 | Levac et al. | |
| 5,875,436 A | 2/1999 | Kikinis | |
| 5,892,909 A | 4/1999 | Grasso et al. | |
| 5,903,830 A | 5/1999 | Joao et al. | |
| 5,905,777 A | 5/1999 | Foladare et al. | |
| 5,928,325 A | 7/1999 | Shaughnessy et al. | |
| 5,933,477 A * | 8/1999 | Wu | 379/88.26 |
| 5,940,475 A | 8/1999 | Hansen | |
| 5,940,478 A | 8/1999 | Vaudreuil et al. | |
| 5,946,386 A | 8/1999 | Rogers et al. | |
| 5,956,681 A | 9/1999 | Yamakita | |
| 5,960,406 A | 9/1999 | Rasansky et al. | |
| 5,964,833 A | 10/1999 | Kikinis | |
| 5,966,663 A | 10/1999 | Gleason | |
| 6,014,429 A * | 1/2000 | LaPorta et al. | 379/88.15 |
| 6,021,433 A | 2/2000 | Payne et al. | |
| 6,034,970 A | 3/2000 | Levac et al. | |
| 6,072,862 A | 6/2000 | Srinivasan | |
| 6,097,791 A * | 8/2000 | Ladd et al. | 379/88.19 |
| 6,112,049 A | 8/2000 | Sonnenfeld | |
| 6,134,235 A | 10/2000 | Goldman et al. | |
| 6,202,060 B1 | 3/2001 | Tran | |
| 6,219,638 B1 * | 4/2001 | Padmanabhan et al. | 704/235 |
| 6,259,772 B1 * | 7/2001 | Stephens et al. | 379/88.23 |
| 6,363,414 B1 | 3/2002 | Nicholls et al. | |
| 6,363,415 B1 | 3/2002 | Finney et al. | |
| 6,393,107 B1 | 5/2002 | Ball et al. | |
| 6,411,696 B1 * | 6/2002 | Iverson et al. | 379/201.06 |
| 6,438,584 B1 | 8/2002 | Powers | |
| 6,442,250 B1 | 8/2002 | Troen-Krasnow et al. | |
| 6,442,592 B1 | 8/2002 | Alumbaugh et al. | |
| 6,498,835 B1 | 12/2002 | Skladman et al. | |
| 6,556,666 B1 * | 4/2003 | Beyda et al. | 379/88.12 |
| 6,597,688 B2 | 7/2003 | Narasimhan et al. | |
| H2079 H | 9/2003 | Menon et al. | |
| 6,630,883 B1 | 10/2003 | Amin et al. | |
| 6,631,258 B1 | 10/2003 | Chow et al. | |
| 6,643,355 B1 * | 11/2003 | Tsumpes | 379/45 |
| 6,647,257 B2 | 11/2003 | Owensby | |
| 2001/0005859 A1 | 6/2001 | Okuyama et al. | |
| 2001/0016868 A1 | 8/2001 | Nakamura et al. | |
| 2002/0065889 A1 | 5/2002 | Macor | |
| 2002/0065890 A1 | 5/2002 | Barron | |
| 2002/0069116 A1 | 6/2002 | Ohashi et al. | |
| 2002/0077130 A1 | 6/2002 | Owensby | |
| 2002/0102993 A1 | 8/2002 | Hendrey et al. | |
| 2002/0156896 A1 | 10/2002 | Lin et al. | |
| 2002/0160794 A1 | 10/2002 | Tisserand et al. | |
| 2002/0161841 A1 | 10/2002 | Kinnunen | |
| 2002/0165923 A1 | 11/2002 | Prince | |
| 2002/0177456 A1 | 11/2002 | Kimoto et al. | |
| 2003/0088434 A1 | 5/2003 | Blechman | |
| 2003/0088465 A1 | 5/2003 | Monteverde | |
| 2003/0110225 A1 | 6/2003 | Billadeau | |
| 2003/0126216 A1 | 7/2003 | Avila et al. | |
| 2003/0154257 A1 | 8/2003 | Hantsch et al. | |
| 2003/0161448 A1 | 8/2003 | Parolkar et al. | |
| 2003/0163536 A1 | 8/2003 | Pettine, Jr. | |
| 2003/0177277 A1 | 9/2003 | Dascalu | |
| 2003/0195937 A1 | 10/2003 | Kircher, Jr. et al. | |
| 2003/0204556 A1 | 10/2003 | Bernard | |
| 2003/0208363 A1 | 11/2003 | Thurnher | |
| 2003/0208545 A1 | 11/2003 | Eaton et al. | |

FOREIGN PATENT DOCUMENTS

| | | |
|---|---|---|
| WO | WO 00/48351 | 8/2000 |
| WO | WO 01/58119 | 8/2001 |
| WO | WO 01/67284 | 9/2001 |
| WO | WO 01/69385 | 9/2001 |
| WO | WO 02/087095 | 10/2002 |

* cited by examiner

Select Delivery Methods

| | Phone | Fax | Pager | E-mail | US Mail | Overnight |
|---|---|---|---|---|---|---|
| Campbell, Elizabeth | ■O □C ■H | □O □H | □P | ■O □H | | |
| Chin, Edward | ■O □C □H □O₂ | ■O □H □O | □P | ■O □H □O | | |
| Coolidge, Jodie | ■O □C | □O | □P | ■O □H | | |
| Edwards, Susan | ■O □C | ■O □H | ■P | ■O □H | | |
| Gonzales, Fred | ■O □C | □O | □P | ■O | | |
| Hurst, Collin | ■O ■C □H | ■O | | ■O □H | | |
| Kaplan, Ernie | □O □C □C₂ | □O | | ■O | | |
| Kendall, Josephine | □O □H □H₂ | □H | | □H | | |
| London, Jack | ■O □C | ■O | | ■O | | |
| Moses, Dan | ■O □C | □O | □P | ■O ■H | | |
| Randall, Kenny | ■O □H | □O | ■P | □O □H | | |
| Song, Charlie | ■O □C □O₂ | ■O | □P | ■O □H | | |

FIG. 2C

← BACK

Fax        (3 of 5)
E-mail     (10 of 10)
Pager      (3 of 3)

| Phone | |
|---|---|
| Requested | 14 |
| Successful | 14 |
| Failed | 0 |
| Remaining | 0 |
| Reply Yes | 10 |
| Reply No | 4 |
| Not Responded | 0 |

| E-mail | |
|---|---|
| Requested | 10 |
| Successful | 10 |
| Failed | 0 |
| Remaining | 0 |
| Reply Yes | 6 |
| Reply No | 4 |
| Not Responded | 0 |

| Fax | |
|---|---|
| Requested | 5 |
| Successful | 3 |
| Failed | 0 |
| Remaining | 2 |

| Pager | |
|---|---|
| Requested | 3 |
| Successful | 3 |
| Failed | 0 |
| Remaining | 0 |

| Response | |
|---|---|
| Questions: Will you | |
| Yes | (16 of 24) |
| No | (8 of 24) |
| None | (0 of 24) |

Message

Subject: Urgent Message: Need to Reschedule Meeting
Body: Due to a serious problem at Capital One our meeting needs to be postponed for a few days. Cancel all existing travel plans immediately to avoid penalty charges.

I would like to reschedule this meeting for the last Tuesday of this month.

As before the agenda will include our revenue plan for the quarter and the launch of our new service.

The MessageBlaster system will ask you to confirm your availability on the new date.

Thank you

Cost: $3.70

Options

| Urgent | YES |
| Fax Cover Sheet | YES |
| Return E-mail | "Henry McMilan" <hmcmilan@teliport.com> |
| Pager Callback# | 9786700023 |

FIG. 2D

MULTI-MODE MESSAGE ROUTING AND MANAGEMENT

This application is a continuation of and claims priority to U.S. application Ser. No. 09/496,170 filed Feb. 1, 2000 now U.S. Pat. No. 6,999,565.

FIELD OF THE INVENTION

The present invention relates to communication services, and in particular to delivery of messages to selected recipients through one or more specified communication modes.

BACKGROUND OF THE INVENTION

Thanks to improvements in technology and widespread consumer interest, once-exotic forms of communication have become commonplace, and today the average consumer has access to a broad array of communication services. The Internet and wireless telephony, once the preserve of an elite few, now routinely supplement traditional telephone services and are frequently supplied by the same carriers. Even inexpensive home computers now include facsimile capability. Businesses employing mobile employees can furnish them with economical pagers that incorporate advanced features, such as text transmission and Internet access.

The sheer proliferation of communication options, while greatly improving access and convenience, has engendered problems as well. The existence of a communication channel does not ensure that the recipient of a message will be "listening" to that particular channel at a given time, yet the sender of a message has no way to know this. Indeed, more channels of communication traffic mean more demands on the attentions of potential recipients, who, feeling besieged by the assault of e-mail, voice mail, pages, etc., may simply inactivate some communication devices at different times. Message senders, therefore, are faced with the choice of risking non-delivery of their messages, or painstakingly retransmitting a message on every possible communication modality.

It may also be difficult to transmit the same message to multiple recipients. While a single e-mail message, sent once, can reach an unlimited number of destinations, phone messages must be repeated for each call. Moreover, different recipients may have access to different communication channels; perhaps some recipients can be reached efficiently only by e-mail, others by fax, and still others by page.

The integration of communication input devices also raises the prospect of messages having multiple forms of content. Today, a single message may include input from a variety of sources (e.g., voice and text); transmitting such a message by traditional means may be quite cumbersome, involving multiple separate transmissions that must be coordinated or difficult "packaging" of the different inputs into a single message.

DESCRIPTION OF THE INVENTION

Brief Summary of the Invention

The present invention facilitates transmission of messages composed on one or more input devices to a single or multiple recipients by means of one or plural communication modalities. Such communication modalities may include, for example, conventional or wireless telephone, facsimile transmission, pager, e-mail, postal mail or courier. Thus, a message may be directed to a single recipient via multiple modalities, such as e-mail and fax, in order to ensure the earliest possible receipt of the message; or a may be directed to multiple recipients by a single modality or by different modalities (e.g., some recipients receive the message by e-mail, others by fax, others by phone). The invention may be configured to respond to defined "escalation" rules that specify conditions under which different delivery modalities may be sequentially employed. For example, the rules may specify that if there is no response to an e-mailed question within an hour, the recipient is to be telephoned. Moreover, in addition to alternative transmission modalities, the escalation rules may specify alternative recipients (as well as alternative modalities for those recipients). The escalation rules may also specify default contact methods, which may apply to specific individuals or to lists of recipients.

The invention may include functionality for determining whether a message has been received (e.g., telephone and e-mail polling), as well as automatic sender notification upon confirmation of receipt. Moreover, in addition to monitoring messages in order to confirm their receipt, the invention may facilitate recipients' responses. In this way, the invention can orchestrate multi-question surveys utilizing multiple communication modes; for example, individuals contacted directly can respond immediately, while others can respond later in accordance with instructions delivered to them—e.g., via a web site or by calling a toll-free number.

In addition, the invention supports messages having embedded questions that call for response by the recipient. Such responses, when received, may be communicated to the message sender and/or accumulated.

The invention may also facilitate scheduling of message delivery, on a mode-by-mode basis where appropriate. Scheduling may include delivery at a particular time or within a designated time window, or may involve preventing delivery during specified "black-out" periods. In some embodiments, scheduling may be automatic and based on considerations such as the recipient's time zone and the form of communication (e.g., to avoid awakening the recipient by telephone).

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

The Internet, which can provide the communication medium of the present invention, is a worldwide "network of networks" that links millions of computers through tens of thousands of separate (but intercommunicating) networks. Via the Internet, users can access tremendous amounts of stored information and establish communication linkages to other Internet-based computers.

Much of the Internet is based on the client-server model of information exchange. This computer architecture, developed specifically to accommodate the "distributed computing" environment that characterizes the Internet and its component networks, contemplates a server (sometimes called the host) that services the requests of a large number of smaller computers, or clients, which connect to it. A server is typically a powerful workstation or mainframe computer, while the clients may be simple personal computers. Servers providing Internet access to multiple subscriber clients are referred to as "gateways"; more generally, a gateway is a computer system that connects two computer networks.

In order to ensure proper routing of messages between the server and the intended client, the messages are first broken up into data packets, each of which receives a destination address according to a consistent protocol, and which are reassembled upon receipt by the target computer. A commonly accepted set of protocols for this purpose are the Internet Protocol, or IP, which dictates routing information; and the transmission control protocol, or TCP, according to which messages are actually broken up into IP packets for transmission for subsequent collection and reassembly. TCP/IP connections are quite commonly employed to move data across telephone lines.

The Internet supports a large variety of information-transfer protocols. The World Wide Web (hereafter simply the "web") represents one of these. Web-accessible information is identified by a uniform resource locator or "URL," which specifies the location of the file in terms of a specific computer and a location on that computer. Any Internet "node"—that is, a computer with an IP address (e.g., a server permanently and continuously connected to the Internet, or a client that has connected to a server and received a temporary IP address)—can access the file by invoking the proper communication protocol and specifying the URL. Typically, a URL has the format http://<host>/<path>, where "http" refers to the HyperText Transfer Protocol, "host" is the server's Internet identifier, and the "path" specifies the location of the file within the server. Each "web site" can make available one or more web "pages" or documents, which are formatted, tree-structured repositories of information, such as text, images, sounds and animations.

An important feature of the web is the ability to connect one document to many other documents using "hypertext" links. A link appears unobtrusively as an underlined portion of text in a document; when the viewer of this document moves his cursor over the underlined text and clicks, the link—which is otherwise invisible to the viewer—is executed and the linked document retrieved. A link may also be associated with a two-dimensional bounded region of a document.

Figure 1:
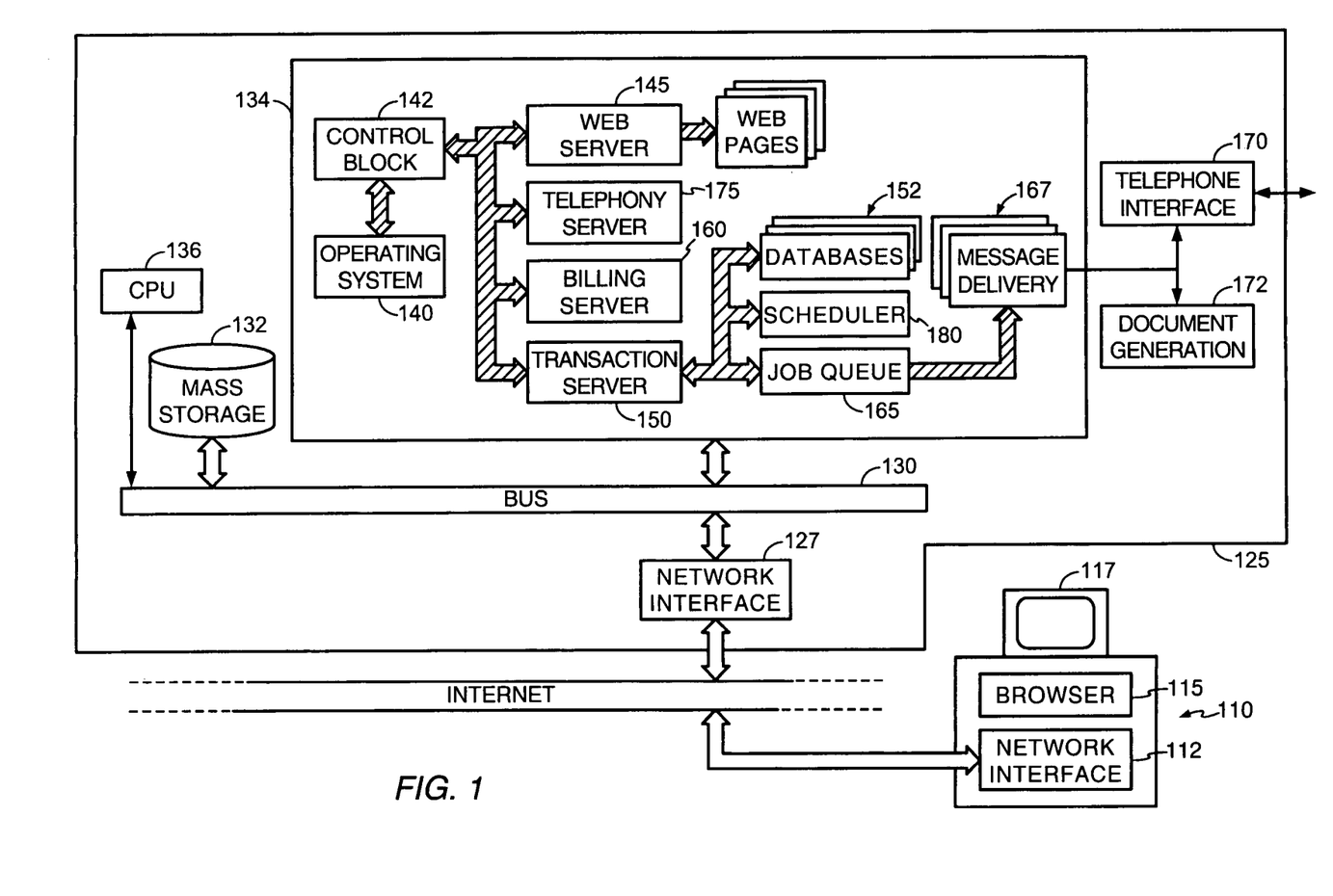
FIG. 1 schematically represents the basic approach of the invention.

Hypertext and searching functionality on the web is typically implemented on the client machine via a web browser. As shown in FIG. 1, a client system 110, belonging to (or operated by) a message sender or recipient, is implemented as a personal computer having a network interface 112 and, running on the system as an active process, a web browser 115. Network interface 112 connects, generally via telephone dial-up, to a gateway or other Internet access provider. As a result, the client machine 110 becomes a node on the Internet, capable of exchanging data with other Internet computers. (Naturally, computer 110 also contains various conventional components, i.e., system storage, an operating system and a graphical user interface, and a keyboard and/or position-sensing device (e.g., a mouse) for accepting input from the customer. For simplicity of presentation, these are not shown.) Browser 115 controls the content presented on a display 117.

With the client connected as an Internet node, the browser utilizes URLs—provided either by the customer or a link—to locate, fetch and display the specified documents. "Display" in this sense can range from simple pictorial and textual rendering to real-time playing of audio and/or video segments or alarms, mechanical indications, printing, or storage of data for subsequent display.

By means of the URL, browser-originated messages reach a server system 125 (which implements the functions of the invention as described below) via the Internet. The browser passes the URL to a protocol handler on server 125, which retrieves and transmits to the client machine 110 rendering instructions defining the requested web page. The browser causes the received information to be cached (usually on a hard disk) on the client computer. A web page may be written in HyperText Markup Language, or HTML, which breaks the document into syntactic portions (such as headings, paragraphs, lists, etc.) that specify layout and contents; and/or in a scripting language such as Java.

Suppose, for example, that the client user instructs the client-resident browser 115 to obtain a document having the URL http://host/file.html. The browser contacts the HTTP server running on "host," and requests the document file.html. The server finds this document and sends it according to the proper Internet protocol, along with a Multipurpose Internet Mail Extension or "MIME" identifier that specifies the document's type. When client 110 receives the document, browser 115 examines the MIME to determine whether it is capable of autonomously displaying the document, or whether an external resource (e.g., a specialized viewer to display video segments) is necessary. In a simple case, the document might contain text and graphics specified in HTML, and specify an image residing in a different file on a different server or on the same server. The browser 115 renders the document in accordance with the HTML instructions and requests the image, displaying it in the document as specified by the instructions when the image arrives.

Server system 125, which is illustrated in greater detail, may be implemented as a single workstation or as a network of server computers, depending on the activity level and included functionality. For explanatory purposes, server 125 is represented as a single machine that includes a network interface 127 continuously connected to the Internet. Network interface 127 and the other internal components of server 125 intercommunicate over a main bidirectional bus 130 (which may be a physical bus in a single hardware device, or can instead represent a network such as a LAN or a WAN). The main sequence of instructions effectuating the functions of the invention and facilitating interaction among clients, server 125, the Internet, and other modes of communication reside on a mass storage device (such as a hard disk or optical storage unit) 132 as well as in a main system memory 134 during operation. Execution of these instructions and effectuation of the functions of the invention is accomplished by a central-processing unit ("CPU") 136.

A group of functional modules that control the operation of CPU 136 and effectuate the operations of the invention is shown conceptually as located in system memory 134; once again, however, it should be stressed that this organization is for explanatory purposes. The various modules and servers may indeed be realized as active processes running on a single machine, but functionality may instead be distributed among multiple machines (or processors within a single machine), once again depending on the activity level and included capabilities.

An operating system 140 directs the execution of low-level, basic system functions such as memory allocation, file management, and operation of mass storage devices 132. At a higher level, a control block 142, implemented as a series of stored instructions, manages interaction among the various functional components of the server and ensures proper routing of data thereamong.

Server 125 is capable of communicating with customers in various modes, primarily by means of the web and electronic mail. Accordingly, a web and e-mail (hereafter "web/mail") server block 145 receives communications from customers via the web and/or e-mail, and transmits proper responses via a network interface 127. All interactions with the customer take place via web/mail server 145 or, in the case of telephone communication, via a telephony server 147; of course, customer interaction using other media or formats is possible (e.g., programmatic interfaces for direct connection to third-party applications), and would be handled by an appropriate server. The pattern of interaction with the customer, the content of transmissions to the customer's computer, and functionality associated with the customer's address book are handled by a transaction server 150.

Transaction server 150 has access to various databases, collectively indicated at 152; these databases, discussed in greater detail below, are ordinarily stored on devices 132 and accessed as necessary. Depending on the customer's requests and interaction with server 125 via browser 115, transaction server 150 selects or causes assembly of various web pages collectively indicated at 155, and causes web/mail server 145 to serve the pages to the client 110 via network interface 127. During an initial interaction with a customer, transaction server 150 obtains payment and identification information, which is stored in the customer's record on a database 152. Credit-card validation and billing for services performed by the invention is handled by a billing server 160.

The various functions performed by the invention, which result in different patterns of interaction with customers, will now be described.

1. Media Conversion and Basic Message Transmission

Web/mail server 145 and telephony server 147, as well as any other media servers, represent the interface servers that provide connecting points for customers. Customer requests are passed from an interface server to transaction server 150, which guides the message-composition process via the interface server(s) (i.e., transaction server 150 returns information to the interface servers, instructing them as to the proper questions to ask the customer). Once the customer has issued sufficient commands and provided sufficient content to fully specify a message (i.e., the message body, the recipient(s), desired delivery methods, and message options such as delivery scheduling and/or escalation rules), a message "job" is created and stored in a database 152. The job is passed to a job queue server 165, which is responsible for implementing and scheduling all message jobs.

At this point, the message remains in the format in which it was composed. As noted previously, however, the invention is capable of receiving messages, via the interface servers, in one format and transmitting them in a different, customer-selected format. The functions of media conversion and message assembly are performed by a series of message delivery servers, collectively illustrated at 167, dedicated thereto. The appropriate message delivery server 167 converts messages to the specified format and causes their transmission, via the designated communication medium, by means of a corresponding device driver selected from among a suite of drivers. The drivers operate a series of transmission devices, which include network interface 127 for e-mail and/or web-based message delivery; a telephone interface 170 for message transmission by telephone, facsimile, pager, or handheld wireless device (although it should be noted that pager and wireless transmission can occur through network interface 127); and a document-generation module 172 for message transmission by postal mail or overnight courier.

The timing of message transmission is governed by job queue server 165. In response to the customer's authorization to send a message, job queue server 150 triggres the conversion and transmission operations just discussed. Job queue server 165 also contains (or, as shown for illustrative purposes, communicates with) a scheduling module 180, which can orchestrate transmission of messages at customer-specified times based on the computer's internal clock.

Figure 2A:
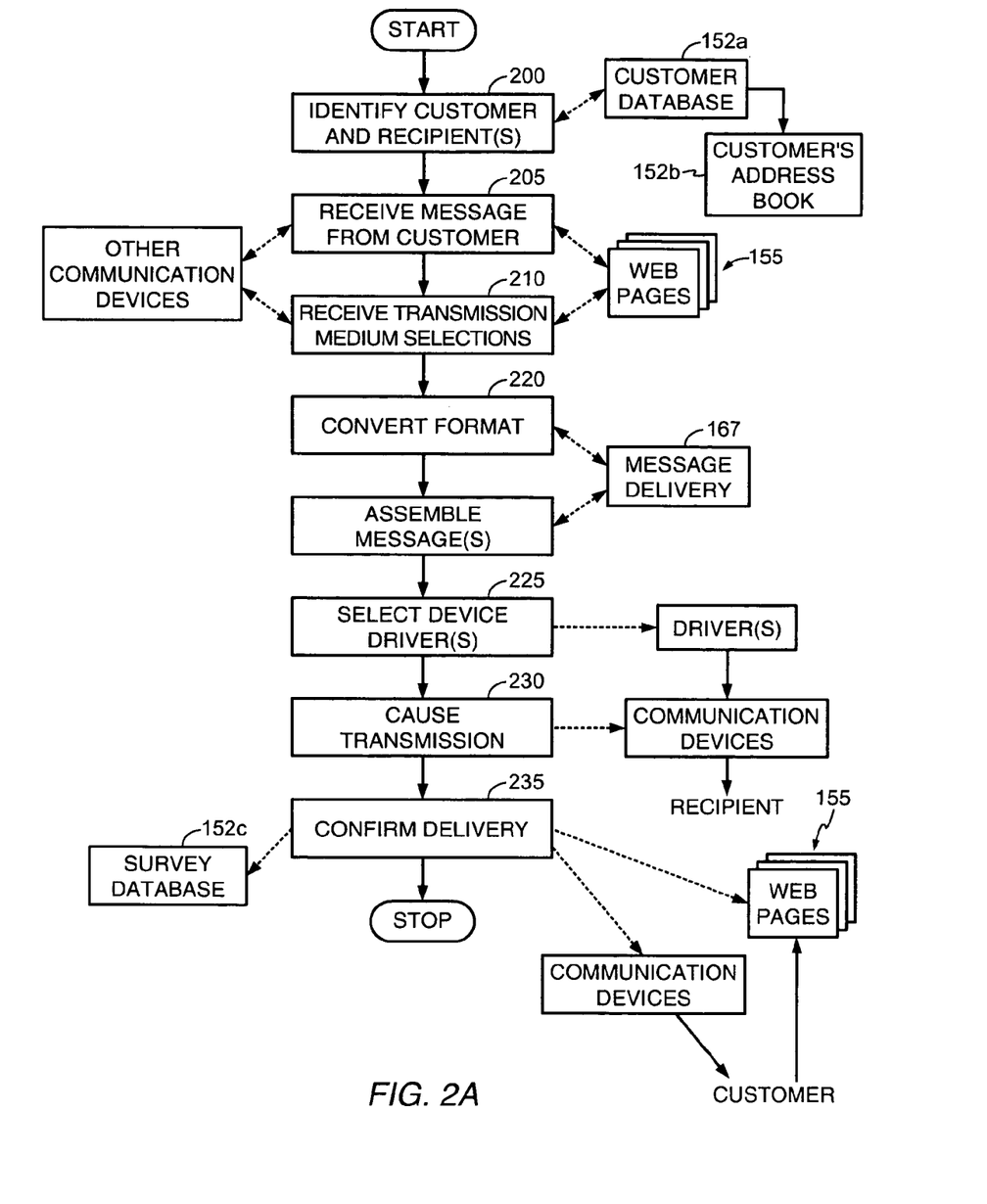
FIG. 2A is a flow diagram illustrating the basic messaging functions of the invention.

The basic operation of these components is set forth in FIG. 2A. In a first step 200, the customer and the desired recipients are identified. Each customer is represented in a customer database 152*a*. Associated with each customer record is an "address book," i.e., a list of contacts (i.e., potential recipients) from which the customer may select. Alternatively, the customer may enter data for a new contact not yet in the address book, in which case the contact is added prior to transmission of the message. Accordingly, the entries in a customer's address book may accumulate passively, as messages are sent; or may be organized and updated by the customer independent of actual message transmission.

Figure 2B:
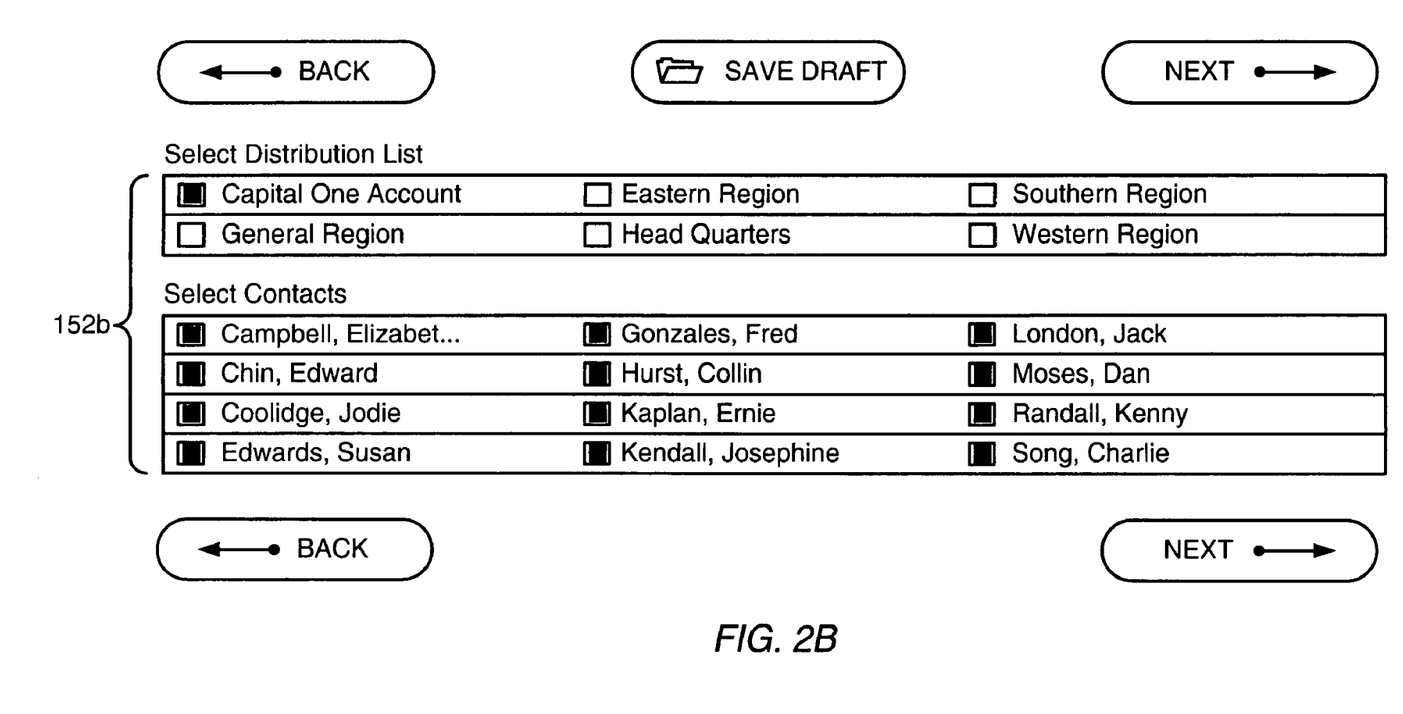
FIG. 2B is an illustrative web page showing selection of contacts and distribution lists.

Preferably, database 152*b* allows address books to be organized into distribution lists, as shown in FIG. 2B. In this way, customers are afforded the opportunity to group contacts into categories meaningful for purposes of message routing. For example, in FIG. 2B, the illustrated distribution lists include a team responsible for a particular account, headquarters, and various regions. These categories, defined by the customer, collect contacts likely to receive similar messages. Selection of one of the distribution lists results in individually selectable display of the contacts within that list, and the customer may indicate all or a subset of those contacts as recipients of a message.

A recipient's data record may include data for the following fields: name; telephone number (home and work, which can be tried sequentially); cellular phone number; facsimile number; postal address; e-mail address; pager number; links to one or more distribution lists; delivery restrictions (e.g., "blackout" periods during which the recipient will not wish to receive telephone calls, or allowed time windows for message transmission by specified modalities); escalation rules (described below); records of messages sent and receipt status; a category field, i.e., a label that facilitates grouping of contacts for purposes of searching and distribution; and company/job title information. Thus, customers may search their address books or distribution lists (or organize distribution lists) in various ways. Most directly, transaction server 150 will have database-search capability allowing customers to sort contacts by category field and search within a selected field. A field may group contacts geographically (such as "headquarters" or "eastern region") or in any other way meaningful to the customer. Moreover, a contact field can itself be further broken down into subfields, e.g., by communication modality or other criteria. Each contact field or subfield can itself represent a distribution list (so that, for example, a customer may direct e-mail to those contacts within the eastern region sublist who have e-mail capability).

In step 205, a message is received from a customer, typically by means of a web page 155, and in step 210, the customer indicates the medium (or media) by means of which the message is to be transmitted. These steps are ordinarily accomplished through the use of web pages 155 that are configured to receive message text and to respond to selection of radio buttons or other indicia in order to determine the customer's selections. The text and selections are processed by transaction server 150, e.g., by means of a script running as an active process therein. As noted above, each customer receives a record in a customer database, which may also include an address list of frequent message recipients (along with data that facilitates routing of messages to these individuals).

Figure 2C:
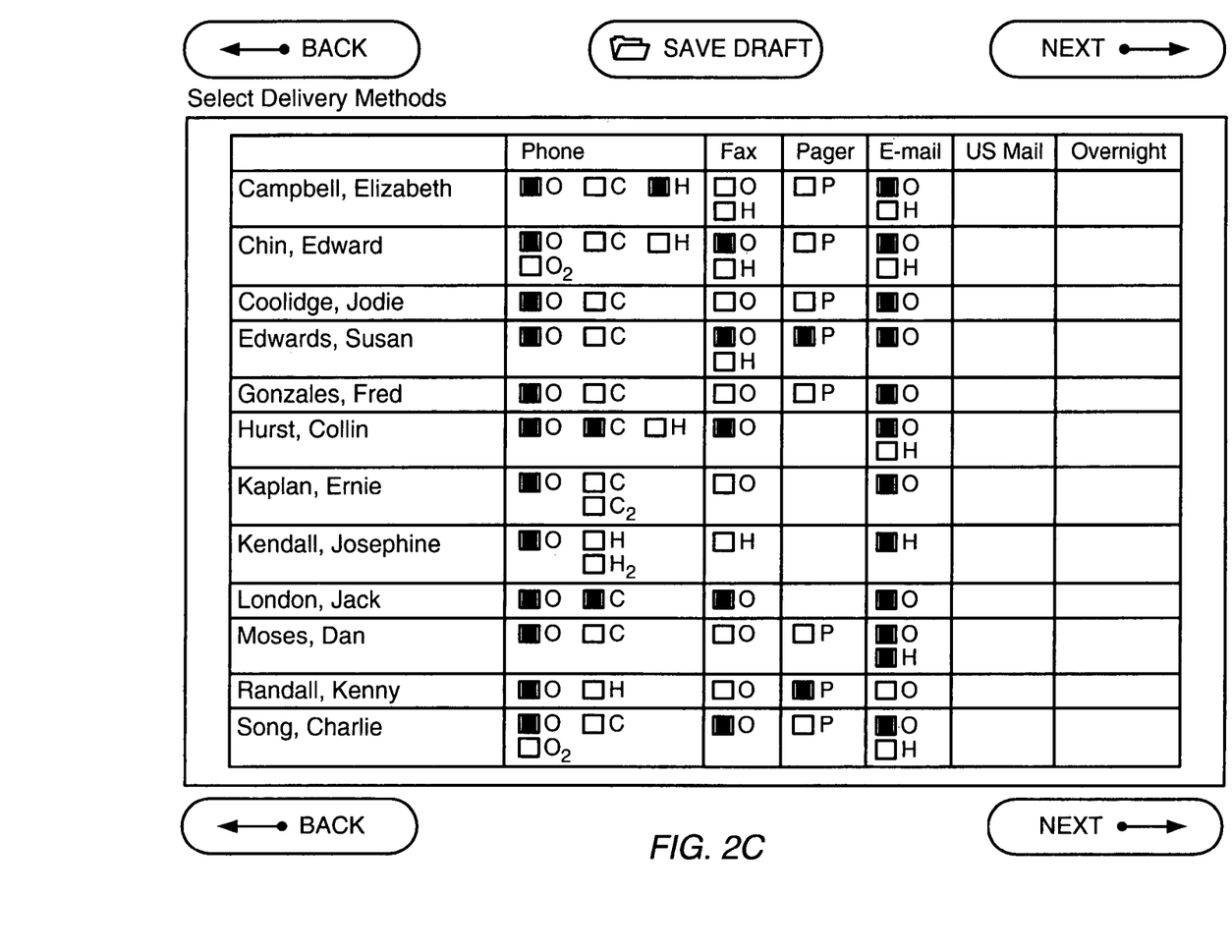
FIG. 2C is an illustrative web page for receiving media selections.

A representative web page for receiving media selections is illustrated in FIG. 2C. Using a mouse or other position-sensing device, the customer clicks to place check marks next to the media by which the message will be sent. The message may be sent via all indicated media, or, as discussed in greater detail below, in accordance with customer-defined "escalation rules" specifying the use of different media only as necessary to achieve a single successful delivery of the message.

In step 220, the format of a received message—typically plain text, if received via a web page—is converted into the format appropriate to each designated transmission medium. For example, in the case of a message to be delivered by e-mail, the text is combined with header information specifying the recipient's electronic address; in the case of facsimile transmission, the text is copied into a cover-page document (e.g., by means of a word-processing application resident on server block 165); and in the case of a letter to be delivered by postal mail or courier, the text is copied into a message or letter format and an envelope or courier pouch prepared. Plain text may also be transmitted to handheld wireless devices (such as so-called "personal digital assistants" or wireless telephones with text-reception capability) by means of telephone interface 170.

More complex modes of processing are also possible. Server block 165 may contain a text-to-speech conversion module, enabling customer-provided text to be transmitted by voice to the recipient by means of telephone interface 170. Conversely, and with renewed reference to FIG. 1, telephony server 147 may be configured to respond to spoken customer commands, allowing the customer to compose and address a message by telephone (i.e., by communicating with server 125 by means of telephone interface 170). For example, through interaction with transaction server 150, the customer may select delivery of a voice message by telephone. To facilitate the customer's communication of the voice message to server 125, telephone interface 170 may be accessed by means of a toll-free number and an access code provided to the customer, via the web, upon selection of the voice-message option. When the customer calls the toll-free number, a messaging system prompts the customer to key in the access code, which causes telephony server to record the message and associate it with the customer's database record for transmission to the designated recipient(s) (and for subsequent billing).

In still more complex operational modes, the invention may facilitate catenation of message—either as separate segments of the same format, or as segments encoded in different formats. In the case of audio messages, for example, a message delivery server 167 may append an audio "header" (typically a so-called "professional prompt") and a "trailer" to the customer's message. Thus, when the recipient answers the telephone, the header portion of the message may tell him that he is about to receive a message from the customer, and the trailer portion may facilitate response (as explained in further detail below).

Message segments having different formats may be composed from a variety of input devices, or may originate as a single composite message with multiple components. For explanatory purposes, consider a simple composite message that includes an audio segment (e.g., a recorded message) and an image. The composite message may be received by server 125 from the customer as a single e-mail with two attachments (a .wav audio file and a .jpg image file) or as two separate e-mails; in either case, a single modality—electronic mail—is employed to deliver both components. Alternatively, the image component may be sent to server 125 by e-mail or by fax, and the audio portion recorded directly by the customer via telephone. (Once again, server 125 may automatically append a header and/or trailer to the audio portion.)

In the former case, transaction server 150 associates e-mails containing components relating to the same eventual message, while job queue server 165 examines the e-mail messages to determine the formats of the different components. Depending on the customer's transmission selections, the different components may simply be attached to an e-mail message as separate files and transmitted to the recipient, or may instead be sent separately by different modalities. For example, suppose the audio component is an alert to police agencies concerning an escaped convict, and the image component is the convict's picture. Given the urgency of the situation, the message sender may wish to have the audio component transmitted by telephone to all commander-level personnel at municipal and state police departments within a defined region, and the image component sent to these departments by e-mail and also be fax. Assuming the message sender has organized a distribution list of commander-level personnel, the message sender simply checks those individuals he wishes to reach; alternatively, the commander-level list may be further broken down into sublists covering particular regions, in which case the message sender would merely select the region or regions of interest. The audio and video components are transmitted to the selected personnel as separate messages via the desired modalities.

It should be understood that the foregoing example highlights only two possible message formats. In fact, a single message can contain components representing any combination of formats (audio, graphics, video, image or other bitmap, text) received from the customer by means of multiple input devices (telephone, web transfer, e-mail, fax). The different formats can be collapsed into a single message (e.g., an image and text can be transmitted by fax), or can be transmitted by diverse modalities best suited to the formats.

In step 225, the driver (or drivers) appropriate to the selected form (or forms) of transmission is selected by a message delivery server 165. At this point the customer may be given a schedule of charges for delivery of the message according to the selected mode or mode of transmission, and given the opportunity to abort message transmission. If the customer decides to proceed, job queue server 165 causes each appropriate driver to activate an associated communication device (step 230) to communicate the message to the recipient. As described in greater detail below, server 125 may confirm that the recipient has in fact received the message (step 235), and communicate this information to the customer via a designated communication device (or devices).

2. Confirming Message Receipt

Any of a variety of techniques can be used to assess whether and when a message is received. Many e-mail systems natively support receipt confirmation. Alternatively, a URL can be embedded in the message; when the recipient receives the e-mail and clicks on this URL, receipt is automatically recorded. Moreover, the web page may contain questions inviting response by the recipient, who thereupon transmits the web page back to server 125 (in particular, to webmail server block 145).

Hard-copy deliveries can be tracked through the courier or by means of a follow-up telephone call to the recipient, while for telephone messages, the recipient can be asked to press a number to confirm receipt. In the context of telephone messages, it may be useful to detect whether a person or an answering machine has answered the phone. This determination can be used, for example, to select a proper audio header or even to choose between alternative messages, which may differ depending whether the message is delivered to the recipient or a recording device; an answering machine, obviously, would not be asked to press a number to confirm receipt, nor would delivery typically be confirmed to the sender if the message was left on an answering machine. To implement answer detection, telephony server 147 is programmed to monitor the level of noise on the line once a connection is established, distinguishing between a "silence" noise level and a "speech" level. If an individual answers, he or she will typically issue a short greeting; that is, the signal pattern of a human answer is a short speech signal followed by silence. An answering machine, by contrast, will generally issue a long greeting ("Hello, you have reached the Smiths . . ."). Based on the observed lengths of a sustained speech signal and an ensuing silence, telephony server 147 forms an initial guess as to whether a person or a machine has answered. If a person is guessed, telephony server 147 will play the audio header that prompts the answerer to press a touch-tone key, and if the proper touch-tone pulse is not detected, server 147 may revise its guess and assume that it is communicating with an answering machine.

The customer may be notified of successful message receipt in any of numerous ways. In the most easily implemented approach, e-mail is sent to the customer when the entire job is complete. The invention may, however, support other capabilities. If the message is urgent, for example, the customer may request immediate notification of successful delivery by a selected modality (telephone, pager, fax, etc.). In this case, when transaction server 150 records receipt of the message, it prepares a confirmation and sends it to the customer, via job queue server 165 and message delivery servers 167, according to the customer's media selection(s). Alternatively, the delivery may simply be recorded in the customer's database record, and the customer accorded access to the information via a web page 155 (that is, the customer sees a standardized delivery-status web page showing data drawn from the delivery field(s) of the customer's data record). Because it is a simple matter to update the customer's data record immediately upon successful message receipt, the status shown in the accessed web page may be quite current.

Figure 2D:
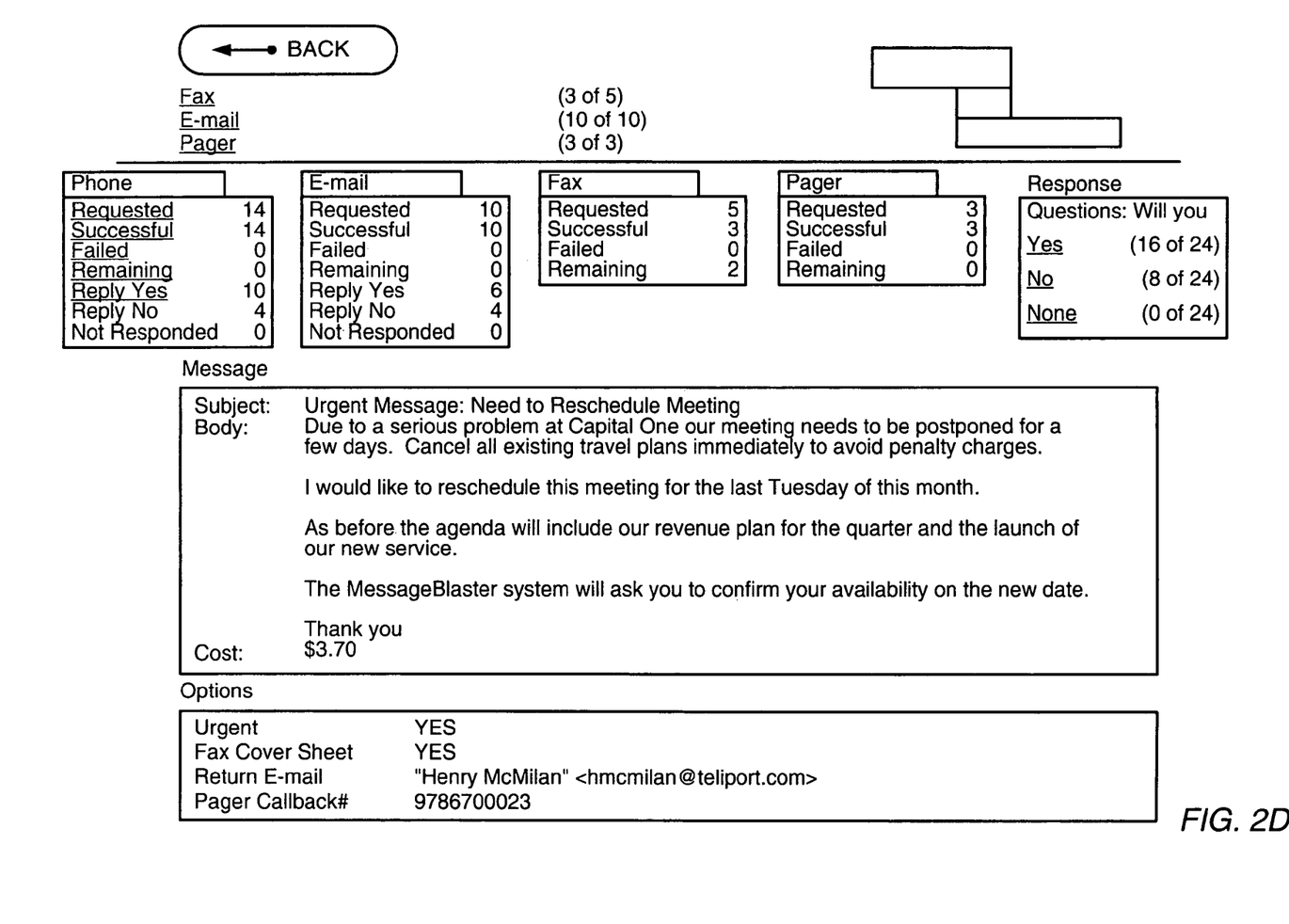
FIG. 2D is an illustrative web page showing tabulated receipt statuses and responses to an embedded question.

If the customer has requested delivery to numerous individuals by various media, these may be grouped and presented as shown in FIG. 2D. Once again, although the format of the web page is standardized, it appears as a customer-specific page because of the message-specific information. This information is drawn, once again, from the fields of the customer's database record relating to the message and from the record created by transaction server 150 when the message was initially submitted.

3. Conducting Surveys

FIG. 2D also illustrates the manner in which the invention can conduct a question-based survey, with the recipients' responses logged into a survey database 152*c* (see FIG. 2C) set up for this purpose. The customer can consult database 152*c* to view the status of the survey, with results tabulated (anonymously or with responder identification) by answer. As shown in FIG. 2D, a single question can be transmitted to numerous recipients by multiple modes, with responses presented in tabular form as they are received. Telephone recipients may be asked to respond by pressing a touch-tone keys corresponding to the desired response. Alternatively, telephony server 147 may be equipped with speech-recognition capability to record (and interpret) spoken answers. For e-mail recipients, the message may include a URL to a web page which, as discussed above, contains the question and a facility for recording the recipient's response, which is transmitted to web/mail server block 145. Fax and pager recipients may simply be asked to call a toll-free number, which can feature an automated response system. (If, for example, customers are restricted to "yes/no" questions, the automated response system can execute a single, unvarying call-flow routine that asks the answerer to press one touch-tone key to signify "yes" and another to signify "no.") If a recipient is not immediately reached—e.g., a telephone answering machine receives the message—information facilitating subsequent response may be appended to the message. Thus, in the case of telephone messages, detection of an answering machine may cause telephony server 147 to add a trailer to the message instructing the recipient to call a toll-free number to provide a response.

Multiple-question surveys are, of course, equally possible, as are questions involving more than two possible answers. These are handled simply by according the recipient more response options.

4. Message Scheduling

It may not be appropriate to transmit messages by certain modes during particular time periods at the recipient's location. These "blackout" time periods may be established automatically by the invention, or may be designated by the customer or the recipient. In the case of customer designation, the customer may indicate blackout time periods for a particular message, or may permanently designate such periods for particular contacts (and particular communication modalities). Most commonly, permanently designated blackout periods are used to prevent messages from being sent by telephone or pager during times when the recipient is generally likely to be asleep or away from the communication modality. Message-specific blackout periods may be utilized by message senders familiar with the recipient's immediate schedule, or who do not wish to permanently establish blackout periods.

Conversely, the customer may specify particular allowed time windows within which a message must be delivered. Once again, these may be established permanently for particular contacts or "on the fly" for specific messages. Moreover, customers who are also potential message recipients can block messages in fax and phone modes during specified times by making appropriate "blackout" entries in his data record; such entries also operate to restrict the times during which a message may transmitted. Thus, before allowing a message to be transmitted, transaction server checks for recipient restrictions specified in the message sender's data record as well as in the recipient's data record, if one exists.

Permanent blackout times or message windows for particular contacts are defined through the customer's interaction with transaction server 150, when the customer enters the information that will be stored in the contact's record in database 152*b*. For example, upon entering a telephone number for telephone contact, the customer may also specify a telephone blackout period and/or allowed time window, which are stored along with the telephone number in the contact record. The contact's local address information allows transaction server 150 to establish a time zone for the contact, which may also be stored in the record.

During message creation, the web page 155 may offer the customer the option to schedule message delivery. Upon selection of this option, the customer is allowed to define a time window—i.e., a time and date when message delivery will first be attempted, and when delivery should be completed. The customer may be queried whether it is more important to finish by the specified completion time or to start transmission by the specified start time. Based on these criteria, scheduler 180 queues the message for transmission, and transaction server 150 monitors its progress. Alternatively or in addition, the customer may be allowed to specify blackout periods during which message transmission will not be attempted. This time may be expressed as the local time of the recipient, in which case scheduler 180 determines the recipient's time zone from the address in his data record and schedules delivery accordingly.

Time-zone scheduling may be employed automatically. For example, if the customer authorizes immediate message delivery at a time that would be late at night where the recipient is located, or schedules message delivery for such a time, transaction server 150 may cause the customer to be prompted with this information and asked to confirm or reschedule delivery.

5. Escalation

Rather than send a message to a prospective recipient redundantly via multiple communication modalities, transaction server 150 may be configured to allow the customer to specify escalation rules for sequential transmission as necessary. The customer selects a plurality of communication modalities and/or contacts, and criteria in the form of rules governing their use. Typically, an escalation rule will specify resort to a different communication modality (or a different recipient) if delivery of the message is not confirmed by a specified time, or within a specified period, using the current communication modality.

Like scheduling restrictions, escalation rules may be defined permanently for a contact (and stored in database 152*b*) or may instead be defined for a particular message. Permanent escalation rules are once again specified through the customer's interaction with transaction server 150, when the customer enters the information that will be stored in the contacts' database records. For example, upon entering information facilitating contact by more than one communication modality, the customer may be prompted to rank the modalities in order of preference, then to specify escalation rules linking sequentially ranked modalities. In the case of telephone delivery, for example, such a rule may take the form of "Proceed to facsimile transmission if no answer within <x> minutes." If the customer selects the rule (he is of course free to decline to do so), the customer is prompted to specify a value for x. This process may continue for the various ranked modalities. The selected rules are then stored in the contact's database record, and when the customer next enters a message destined for that contact, the escalation rules may be applied automatically. The modality indicated in the record as most preferred will be employed by default if the customer specifies no modality for message delivery; if the customer specifies a modality somewhere within the rankings, the escalation rules will be sequentially applied from that point forward through the hierarchy.

Default message modalities and permanent escalation rules are particularly useful in the context of distribution lists, since the customer can simply enter a message and leave it to server 125 to deliver it to every person on a selected distribution list in accordance with each contact's escalation rules.

On the other hand, the customer may also be given the opportunity to select message-specific escalation rules during message creation; this option is provided when the customer specifies more than one communication modality for a message, and is useful where no escalation rules have previously been defined or to override defined escalation rules in particular instances.

To implement the escalation rules, the time period specified in a rule relevant to the initial message transmission is sent to scheduler 180. At the end of that time period following transmission, transaction server 150 determines whether the message has been received in the manner described above. If not, the escalation rule (defined in database 152*b* or in the transaction record for the particular message) is executed, and the message re-transmitted by a different modality. If further escalation rules remain for the message, the appropriate time period is once again provided to scheduler 180, and the flow sequence repeated.

It will therefore be seen that the foregoing represents a full-featured messaging system capable of operating in multiple communication modes and handling multiple message formats, all in accordance with variety types of customer-specified message criteria. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. Apparatus comprising:
   a message server comprising a plurality of modalities for transmitting messages;
   a sender interface configured to receive from a sender a given message and a designation of a plural set of designated modalities, designated by the sender, including at least some of the transmission modalities at least some of which are yet to be used to transmit the given message;
   memory-stored escalation rules specifying sequential transmission of the given message by each of the designated modalities upon occurrence of a specified condition; and
   a routing facility configured to, responsive to the escalation rules and to the occurrence of the specified condition, cause the given message to be sequentially transmitted by the message server via the designated modalities in accordance with the escalation rules;
   wherein the sender interface comprises an escalation rule receiver configured to receive escalation rules from a message sender.

2. The apparatus of claim 1, wherein the specified condition associated with at least some of the modalities is non-receipt of the message transmitted via said modalities.

3. The apparatus of claim 1, wherein the modalities comprise electronic mail, facsimile transmission, public telephone network, cellular telephone, pager, and postal mail.

4. The apparatus in claim 3, wherein the specified condition associated with telephone transmission is non-receipt of the message, the system further comprising a non-receipt detector configured to detect said non-receipt.

5. The apparatus of claim 1, further comprising a notifier configured to notify, by at least one of the transmission modalities, a source of the given message that the given message has been received.

6. The apparatus of claim 1, wherein the escalation rules specify a default transmission modality, and wherein the routing facility is configured to cause the given message to be transmitted via the default modality if no designation is received by the sender interface.

7. The apparatus of claim 1, further comprising:
a response receiver configured to receive, at the message server, a response to the given message after the given message has been received by a recipient; and
memory for collecting records of responses including the response, the sender interface being configured to tabulate and present the records in a summary format.

8. The apparatus of claim 1, wherein the sender interface is further configured to receive, from a message sender, a global list of potential message recipients and criteria associated with respective one of the potential message recipients in the global list, the sender interface facilitating searching of the list based on specified criteria and identification of potential recipients whose recipient criteria match the specified criteria.

9. Apparatus comprising:
a message server comprising a plurality of modalities for transmitting messages;
a sender interface configured to receive from a sender a given message and a designation of a plural set of designated modalities, designated by the sender, including at least some of the transmission modalities at least some of which are yet to be used to transmit the given message;
memory-stored escalation rules specifying sequential transmission of the given message by each of the designated modalities upon occurrence of a specified condition; and
a routing facility configured to, responsive to the escalation rules and to the occurrence of the specified condition, cause the given message to be sequentially transmitted by the message server via the designated modalities in accordance with the escalation rules;
wherein the sender interface is further configured to receive, from a message sender, a list of recipients for the given message, and escalation rules for each recipient, and different designated modalities for respective ones of the recipients, the routing facility being configured to cause the given message to be transmitted to each recipient by the message server in accordance with the escalation rules.

10. Apparatus comprising:
a message server comprising a plurality of modalities for transmitting messages;
a sender interface configured to receive from a sender a given message and a designation of a plural set of designated modalities, designated by the sender, including at least some of the transmission modalities at least some of which are yet to be used to transmit the given message;
memory-stored escalation rules specifying sequential transmission of the given message by each of the designated modalities upon occurrence of a specified condition; and
a routing facility configured to, responsive to the escalation rules and to the occurrence of the specified condition, cause the given message to be sequentially transmitted by the message server via the designated modalities in accordance with the escalation rules;
wherein the sender interface is further configured to receive, from a message sender, a global list of potential message recipients and criteria associated with respective one of the potential message recipients in the global list, the sender interface facilitating searching of the list based on specified criteria and identification of potential recipients whose recipient criteria match the specified criteria; and
wherein the recipient criteria for respective ones of the potential message recipients include escalation rules.

* * * * *